United States Patent
Hirose et al.

(10) Patent No.: US 8,259,414 B2
(45) Date of Patent: Sep. 4, 2012

(54) MAGNETIC RECORDING DISK HAVING ALIGNING PATTERN AND METHOD FOR ALIGNING THEREOF

(75) Inventors: Takenori Hirose, Kanagawa (JP); Yasuhiro Yoshitake, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 533 days.

(21) Appl. No.: 12/156,338

(22) Filed: May 29, 2008

(65) Prior Publication Data
US 2008/0298222 A1    Dec. 4, 2008

(30) Foreign Application Priority Data
May 29, 2007    (JP) ................................ 2007-142236

(51) Int. Cl.
*G11B 5/82* (2006.01)
(52) U.S. Cl. ............................. 360/135; 360/25; 360/69
(58) Field of Classification Search ............... 369/275.4, 369/275.1, 275.3, 275.2; 360/135, 25, 27, 360/31, 48, 69, 71, 77.04; 428/831
See application file for complete search history.

(56) References Cited

U.S. PATENT DOCUMENTS

| | | | | |
|---|---|---|---|---|
| 4,340,305 A * | 7/1982 | Smith et al. | | 356/509 |
| 4,680,744 A * | 7/1987 | Kanamaru | | 369/44.32 |
| 5,115,424 A * | 5/1992 | Nakajima et al. | | 369/275.4 |
| 5,383,070 A * | 1/1995 | Bond | | 360/77.04 |
| 5,602,819 A * | 2/1997 | Inagaki et al. | | 369/275.4 |
| 5,754,520 A * | 5/1998 | Tompkin et al. | | 369/275.1 |
| 6,226,109 B1 * | 5/2001 | Tompkin et al. | | 359/2 |
| 6,421,199 B1 * | 7/2002 | McKenzie et al. | | 360/77.04 |
| 6,529,341 B1 * | 3/2003 | Ishida et al. | | 360/48 |
| 6,624,976 B2 * | 9/2003 | Takino | | 360/135 |
| 8,072,615 B2 * | 12/2011 | Musa et al. | | 356/620 |
| 2006/0007569 A1 * | 1/2006 | Komine et al. | | 360/17 |
| 2006/0139805 A1 | 6/2006 | Akamatsu et al. | | |

FOREIGN PATENT DOCUMENTS

| | | |
|---|---|---|
| JP | 2006-185545 | 7/2006 |
| JP | 2006-318611 | 11/2006 |

* cited by examiner

Primary Examiner — Tan X Dinh
(74) Attorney, Agent, or Firm — Zilka-Kotab, PC

(57) ABSTRACT

Embodiments of the invention provide patterned media in which the center and the direction of the disk can be detected. According to one embodiment, patterned media has a bit pattern including convex portions of a magnetic material on one surface or both surfaces of a nonmagnetic substrate having a central hole. A diffraction grating pattern is formed as an alignment pattern in the inner circumference (or outer circumference) of the patterned media. The diffraction grating pattern is a pattern having a repetitive configuration, and includes a pattern with a repetitive pitch different from that in other portions, or a portion having no pattern, at least one region on a circumference. The diffraction grating pattern is irradiated with detection light and diffracted light is detected, thereby a center and a direction of the disk can be detected.

13 Claims, 11 Drawing Sheets

MAGNETIC RECORDING DISK HAVING ALIGNING PATTERN AND METHOD FOR ALIGNING THEREOF

CROSS-REFERENCE TO RELATED APPLICATION

The instant nonprovisional patent application claims priority to Japanese Patent Application No. 2007-142236 filed May 29, 2007 and which is incorporated by reference in its entirety herein for all purposes.

BACKGROUND OF THE INVENTION

Recently, hard disk drives are increasingly used not only for a server or computer, but also for various applications such as home hard disk recorders, car navigation systems, and portable audio-video reproducing equipment. In addition, capacity of the drive tends to increase with progress in digitalization of various applications. A hard disk as a recording medium needs an increase in recording density in order to increase capacity of the hard disk. As a technique for increasing recording density of the hard disk, patterned media is expected to be introduced in the future. A current hard disk records data by magnetizing a magnetic film formed on a surface of a disk substrate. However, bit patterned media (one example of the patterned media) is provided such that a bit pattern of a magnetic material is formed on a surface of a disk substrate, and one convex portion in the bit pattern corresponds to a unit of recording.

Japanese Patent Publication No. 2006-185545 ("Patent document 1") describes that while discrete track, which is one of the patterned media, is used to enable high density recording, a magnetic track of a magnetic disk needs to be situated concentrically with a rotational center of a spindle motor in order to accurately perform recording and reproducing, and describes that a recognition track is formed in a landing area at an outer circumferential side of a data recording area in order to measure the amount of eccentricity of the magnetic disk with respect to the rotational center of the spindle motor.

Japanese Patent Publication No. 2006-318611 ("Patent document 2") describes that a mirror or a transparent part for reflecting or transmitting detected light is formed in an inner or outer circumferential portion of discrete track media as a positioning mark situated on a circle concentric with a discrete groove, and the discrete track media is mounted on a turntable in such a manner that a center of the positioning mark is detected, and the detected center is aligned with a rotational center of the turntable.

The patterned media are generally prepared by using a nanoimprinting technology. That is, an irregular pattern of a mold is transferred to a magnetic layer, thereby a discrete track or a bit pattern is formed. In the case that the mold itself has a defect, or a foreign substance is adhered on the mold, a pattern to be transferred also has a defect. Therefore, before the media are completed as a magnetic disk by introducing the nanoimprinting technology, in a stage that the discrete track or the bit pattern has been formed, additional inspection is necessary on whether the discrete track or the bit pattern is appropriately formed.

As a method of inspecting a fine bit pattern in several ten nanometers, use of SEM or AFM is considered. However, according to these methods, only a limited area on the disk can be inspected from the viewpoint of securing certain throughput.

Since the bit pattern mainly has a repetitive structure, a method of using an optical scatterometry is considered as the inspection method. When a fine, repetitive structure is formed on an objective surface, reflectivity of the objective surface can be calculated by using a method such as RCWA (Rigorous coupled analysis) as one of electromagnetic wave analysis methods. The scatterometry is a method of detecting a configuration of an object by fitting reflectivity obtained by calculation to actually detected reflectivity (refer to FIG. 3). In this method, since a detection view can be made large, several tens to a few hundred micrometers, in addition, reflectivity can be detected in a short time, inspection can be performed at high speed, and the whole surface of a disk can be inspected. However, according to the method, it may be considered that even if configurations of bit patterns are differently deformed from each other, surface reflectivity is not different, and it may be considered that while a fact that an objective bit pattern has a defect can be detected, a type of the defect cannot be specified.

Thus, it may be considered that both are combined, so that an optimum inspection system can be established. That is, as shown in FIG. 5, the system is designed such that the whole surface of a disk is inspected using an optical inspection apparatus, and when a type of a defect cannot be specified, detailed inspection is performed by using SEM or AFM. By establishing such a system, the whole surface of the disk can be inspected without reducing throughput, in addition, a type of a defect can be specified.

However, a position (coordinates) of a defect on a disk surface needs to be exchanged between the optical inspection apparatus, SEM, and AFM in order to establish the inspection system as above. However, since current disk media have nothing as a coordinate reference for specifying the defect position, the coordinates cannot be exchanged between them. The reason why the disk media have nothing as the coordinate reference is because the current disk is manufactured by simply stacking magnetic films and the like, and inspection of the disk is performed mainly on the number of defects, and coordinates of the defects need not be controlled.

In the patterned media being expected to be introduced in the future, detection of a center and a direction of a disk is newly required in order to specify coordinates of a disk in a condition that information for positioning is not recorded on a magnetic recording surface.

During surface inspection in a manufacturing process of patterned media, while a center and a direction of a disk need to be detected to accurately align the disk with a stage, the direction cannot be detected in a current disk.

BRIEF SUMMARY OF THE INVENTION

Embodiments of the present invention provide patterned media in which the center and the direction of the disk can be detected. According to the particular embodiment of FIGS. 1 and 2, patterned media 1 has a bit pattern 6 including convex portions 4 of a magnetic material on one surface or both surfaces of a nonmagnetic substrate 2 having a central hole 3. A diffraction grating pattern 20 is formed as an alignment pattern in the inner circumference (or outer circumference) of the patterned media 1. The diffraction grating pattern 20 is a pattern having a repetitive configuration, and includes a pattern with a repetitive pitch different from that in other portions, or a portion having no pattern, at least one region on a circumference. The diffraction grating pattern 20 is irradiated with detection light and diffracted light is detected, thereby a center and a direction of the disk 1 can be detected.

DETAILED DESCRIPTION OF THE INVENTION

Figure 1:
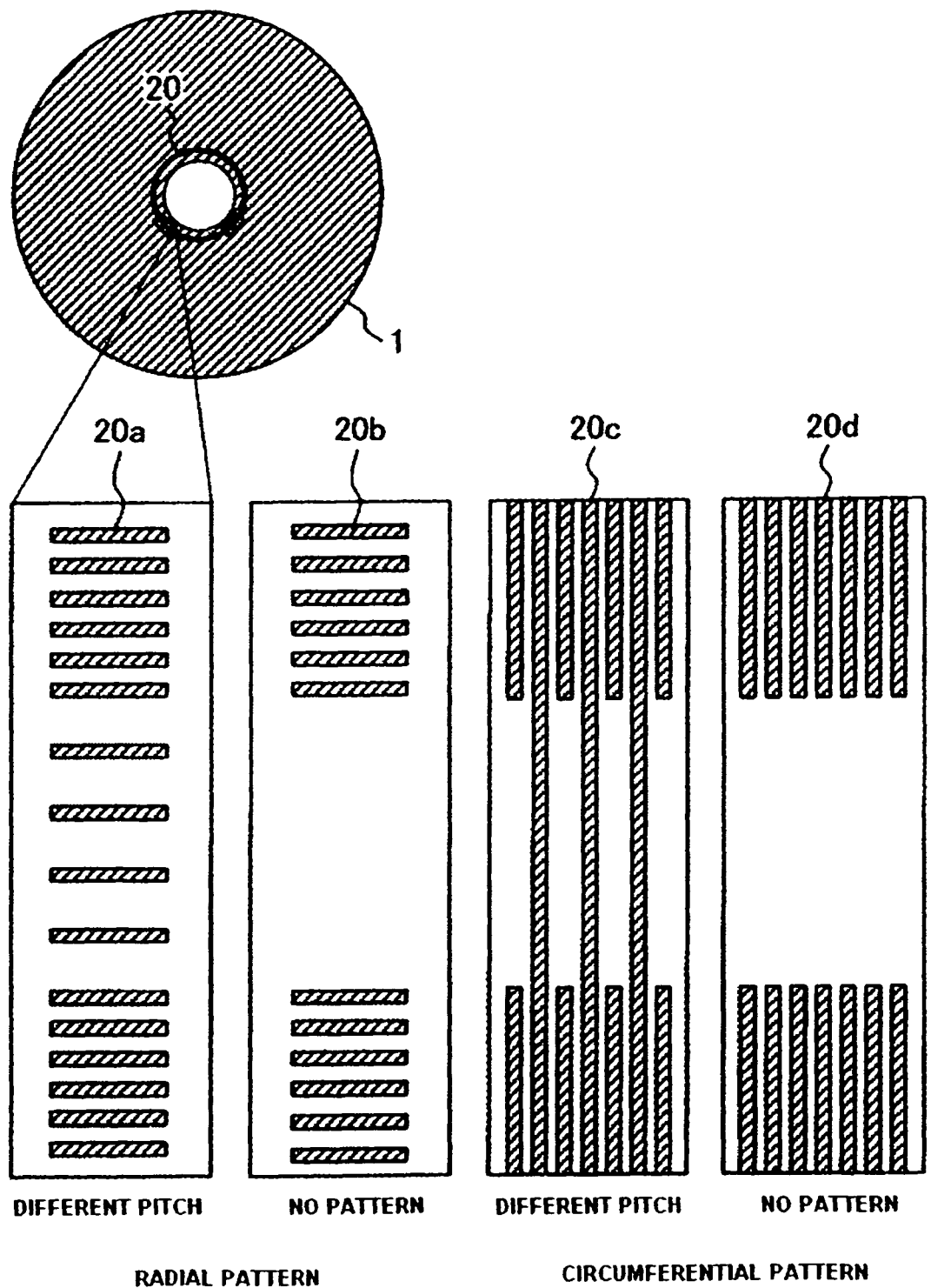
FIG. 1 shows a schematic plan diagram showing a configuration of patterned media according to example 1.

Embodiments of the present invention relate to hard disk media having a discrete track or a bit pattern, and particularly relates to a structure of hard disk media that can be accurately aligned with a disk holding stage in inspection during a manufacturing process. Moreover, embodiments of the invention relates to a method of aligning hard disk media with a disk holding stage of an inspection apparatus.

An object of embodiments of the invention is to provide patterned media in which the center and the direction of the disk can be detected.

Another object of embodiments of the invention is to provide a method of accurately positioning patterned media on a disk holding stage of a surface inspection apparatus.

Typical patterned media of embodiments of the invention has a substrate, and a discrete track, in which grooves are formed with a predetermined track pitch, or a bit pattern, which is regularly dispersed with a predetermined track pitch and a predetermined bit cycle, between inner and outer circumferential portions of the substrate; wherein a diffraction grating pattern is provided on the circumference of the inner or outer circumferential portions of the substrate, and a portion with a pitch different from a pitch in other portions is provided in at least one region of the diffraction grating pattern.

A method of positioning a typical patterned-media of embodiments of the invention on a disk holding stage of a surface inspection apparatus includes a step of holding the patterned media on the disk holding stage; a step of irradiating light to a diffraction grating pattern while rotating the patterned media; a step of detecting diffracted light from the diffraction grating pattern; a step of detecting the amount of eccentricity and an angle of the patterned media from the detected diffracted light; a step of detecting a center and a direction of the patterned media from the detected amount of eccentricity and the detected angle; and a step of adjusting a position of the disk holding stage such that the detected center and the detected direction correspond to a desired center and a desired direction respectively.

According to embodiments of the invention, when patterned media is positioned on a disk holding stage of a surface inspection apparatus, a center and a direction of a disk can be detected. Thus, the patterned media can be accurately positioned on the disk holding stage. Moreover, a position where a defect in configuration of a recording pattern on the disk can be specified.

A method of detecting a center and a direction of a circular component includes an alignment method of a wafer in a semiconductor manufacturing process. While a wafer has a circular shape similarly as hard disk media, the wafer has a physical cutout in shape such as an orientation flat or a notch, and a circuit pattern is formed based on a position of such a cutout. A center of the wafer can be detected by detecting an external form of the wafer, and a direction of the wafer can be detected by detecting the orientation flat or the notch. However, in the case of the hard disk media, since the media itself is rotated at high speed, the physical cutout such as orientation flat or notch cannot be formed. Therefore, the center of the disk can be obtained according to the above method, but the direction of the disk cannot be detected. Hereinafter, hard disk media (patterned media) according to examples of the invention are described, in which the center and the direction of the disk can be detected.

Figure 2:
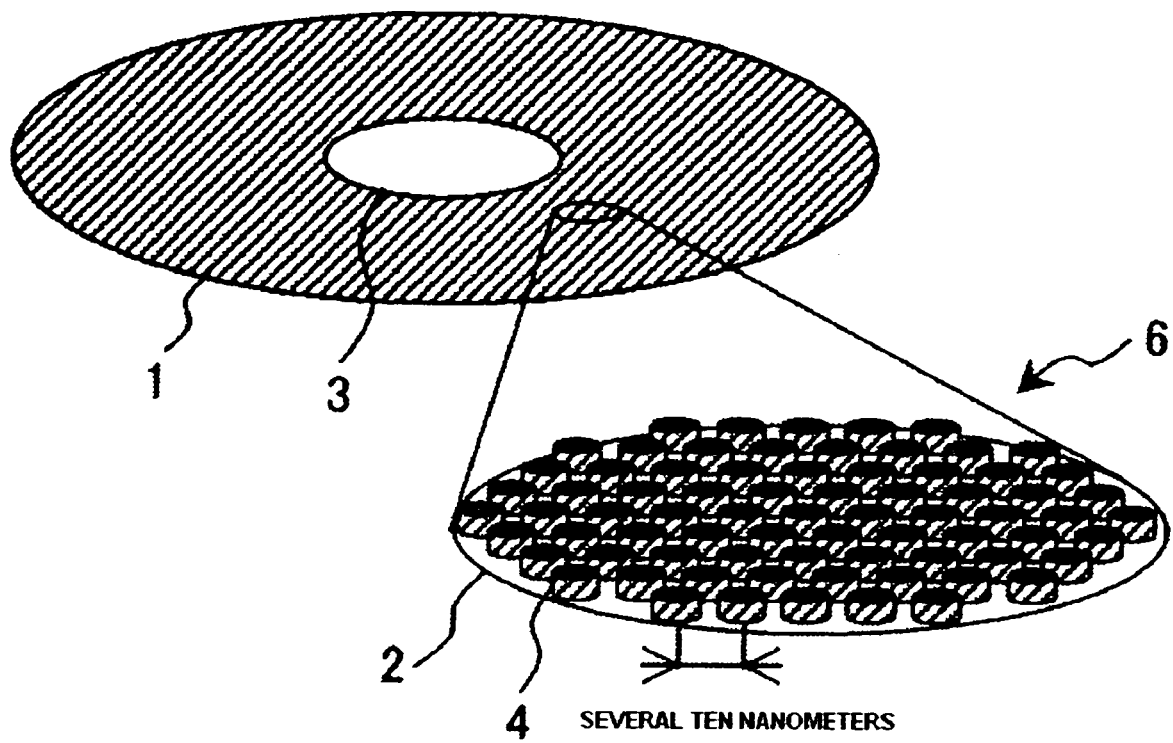
FIG. 2 shows a schematic diagram showing a basic configuration of the patterned media.
Figure 3:
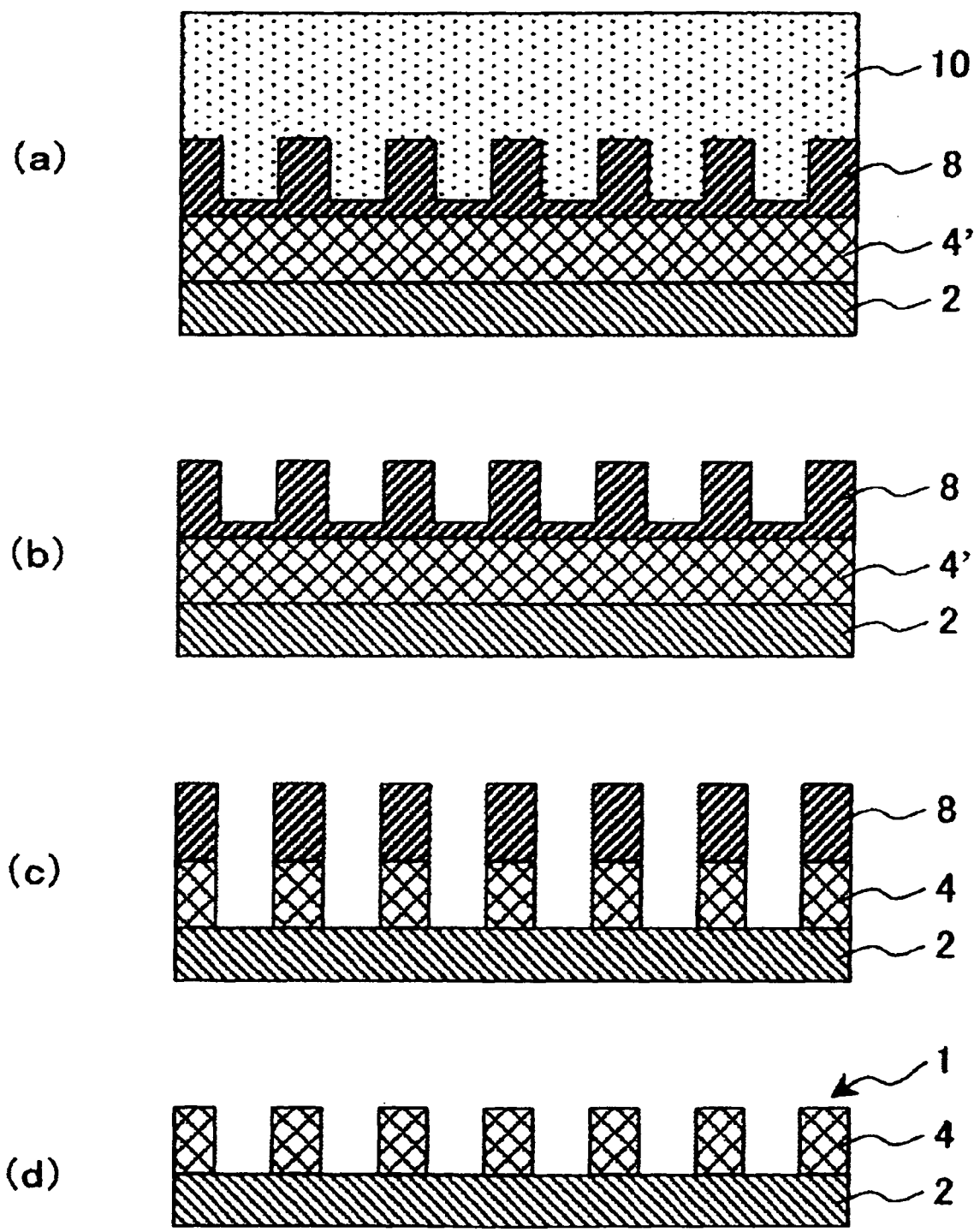
FIGS. 3(a)-3(d) are process diagrams showing a method of manufacturing the patterned media.

First, a schematic configuration of bit patterned media as one of patterned media is described with reference to FIG. 2. Bit patterned media 1 has a bit pattern 6 including convex portions 4, which are regularly dispersed with a predetermined track pitch and a predetermined bit cycle, on one surface or both surfaces of a nonmagnetic substrate 2 such as glass substrate having a central hole 3. A convex portion 4 corresponds to a unit of recording. An outline of a method of manufacturing the bit patterned media 1 is described with reference to FIGS. 3(a)-3(d). A nanoimprinting technique is used for formation of the bit patterned media 1. As shown in FIG. 3(a), a magnetic layer 4' is formed on a disk substrate 2 such as glass substrate, then a resist 8 is coated on the magnetic layer 4', and then a mold 10 transmitting light having an irregular pattern is pressed to the resist 8, and then the resist 8 is exposed to light in such a condition. Next, the mold 10 is removed as shown in FIG. 3(b), and then the magnetic layer 4' is etched with the resist 8 as a mask as shown in FIG. 3(c). Next, the resist 8 is removed as shown in FIG. 3(d), so that a bit pattern 6 to which the irregular pattern of the mold 10 is transferred is formed. In the case of perpendicular magnetic recording media, the magnetic layer 4' is desirably formed as a stacked film of a soft magnetic layer and a hard magnetic layer.

Next, features of patterned media according to example 1 of the invention are described with reference to FIG. 1. A basic configuration is the same as the configuration of the bit patterned media as shown in FIG. 2, and the same references are used for the same components. In the example, a diffraction grating pattern 20 is formed as an alignment pattern in the inner circumference (or outer circumference) of the patterned media (hereinafter referred to as disk) 1. The diffraction grating pattern 20 is irradiated with detection light and diffracted light is detected, thereby a center and a direction of the disk 1 can be detected. The diffraction grating pattern 20 is made as a pattern having a repetitive configuration as shown in FIG. 1. In at least one region on the circumference, a pattern with a repetitive pitch different from that in other portions is provided, or a portion having no pattern is provided. The figure shows radial patterns and circumferential patterns as examples of the diffraction grating pattern 20.

Two diffraction grating patterns 20a and 20b in the left of FIG. 1 are examples of the radial, repetitive pattern. The diffraction grating pattern 20a is an example where a pattern having a different pitch is inserted in a part of a repetitive pattern, and the diffraction grating pattern 20b is an example where no pattern exists in the part of the repetitive pattern. On the other hand, the right two are examples where a repetitive pattern is provided in a circumferential direction respectively, and a diffraction grating pattern 20c is an example where a pattern having a different pitch is inserted in a part of a repetitive pattern, and the diffraction grating pattern 20d is an example where no pattern exists in the part of the repetitive pattern. While these patterns are drawn as if they are arranged in a straight line in FIG. 1, the patterns are actually disposed in a circumferential shape.

Figure 6:
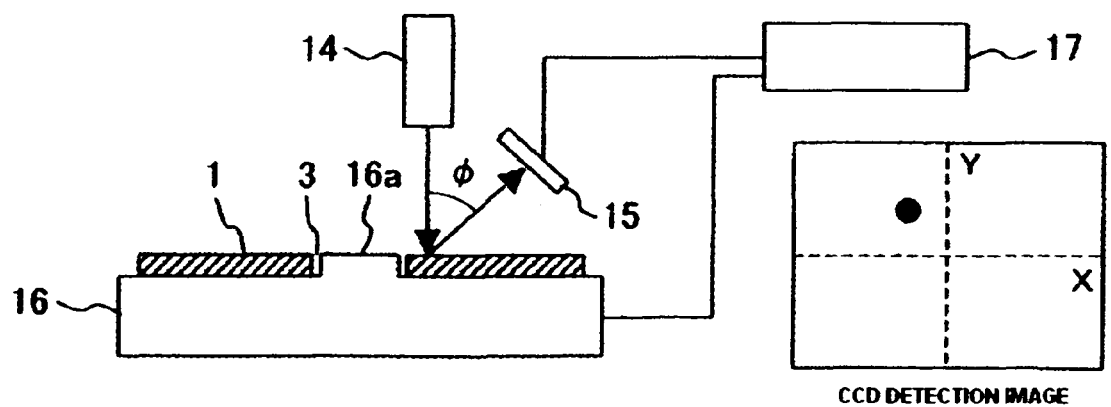
FIG. 6 shows a schematic diagram showing a schematic configuration of an alignment apparatus.

The diffraction grating pattern 20 can be formed concurrently with formation of the bit pattern 6 by using the mold 10. The repetitive pitch can be determined by a wavelength of the detection light or a layout of a diffracted-light detector. As shown in FIG. 6, in the case that detection light from a detection light irradiation optical-system 14 is perpendicularly irradiated to a disk surface, when it is assumed that the wavelength of the detection light is γ, a layout angle of a detector 15 is Φ, and a pitch of the diffraction grating pattern is p, a relationship of γ/p=sin Φ holds. Respective values can be determined based on the relationship. Moreover, in the case that the detection light is irradiated at a non-perpendicular angle, since the same relationship holds, the values can be determined based on the relationship.

Next, description is made on a method of detecting a center and a direction of the disk 1 by using the diffraction grating pattern 20. FIG. 6 shows a schematic diagram of an alignment apparatus provided in an optical inspection apparatus or the like. The alignment apparatus includes the detection light irradiation optical-system 14, the detector 15, a disk holding stage 16, and a signal processor 17. The figure shows a case of using a CCD camera as the detector 15, wherein diffracted light from the diffraction grating pattern 20 can be detected in a two-dimensional area. A single-wavelength light such as laser light is suitable for a detection light source. The disk holding stage 16 preferably has a configuration where an XY stage is set on a θ stage (rotational stage). While FIG. 6 shows a case that light is perpendicularly irradiated to a disk surface, even if the light is obliquely irradiated to it, the same effects can be obtained.

Figure 7:
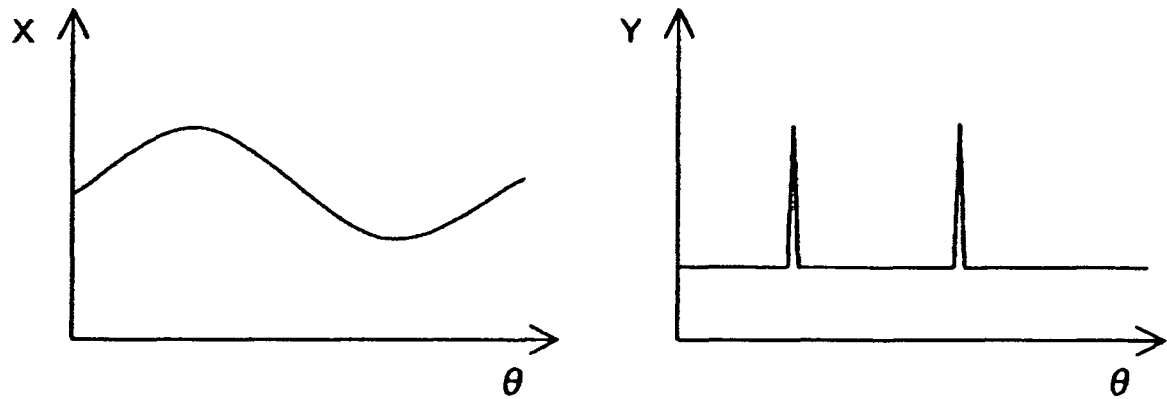
FIG. 7 shows a diagram showing an example of a detection result of diffracted light by the alignment apparatus.

As shown in FIG. 6, a central shaft 16a of the disk holding stage 16 is inserted into a central hole 3 of the disk 1, so that the disk 1 is held by the disk holding stage 16. While the disk 1 is rotated by the disk holding stage 16, light emitted from the detection light, irradiation optical-system 14 is irradiated to the diffraction grating pattern 20 formed in the inner circumference of the disk 1, and diffracted light from the diffraction grating pattern 20 is detected by the CCD camera 15. Now, consideration is made on a case that the diffraction grating pattern 20 is assumed to be the repetitive pattern 20a or 20b, and the CCD camera 15 is arranged such that an X direction is a radial direction of the disk 1, and a Y direction is a circumferential direction thereof. When diffracted light is detected while the disk 1 is rotated, a detection position of the diffracted light is moved on the CCD camera 15. FIG. 7 shows movement of the detection position of the diffracted light in the X and Y directions of the CCD camera 15 with respect to a rotational angle θ of the disk 1.

When eccentricity exists between the center of the disk 1 and the rotational center, as shown in a graph in the X direction, a position in an X direction of diffracted light is detected while the position is changed in a form of a sine curve according to rotation of the disk 1. When the disk 1 is made a turn, one maximum value and one minimum value appear respectively, and rotation angles at which the respective values are detected are shifted by 180 degrees from each other. A direction in which the maximum or minimum value is given is an eccentric direction, and an average value of the maximum and minimum values corresponds to the amount of eccentricity.

On the other hand, for the direction of the disk 1, movement in the Y direction of the disk 1 is focused. As described before, at least one region, in which a portion having a different repetitive-pitch or a portion having no pattern exists, is provided in the diffraction grating pattern 20a or 20b. Therefore, a position of diffracted light is varied in such a region, or diffracted light is eliminated in the region. Thus, the direction of the disk 1 can be detected by detecting an angle of the diffracted light in such a state. FIG. 7 shows an example of a case that there are two regions where the repetitive pitch is varied. As shown by a graph in the Y direction, the position of diffracted light is changed at the rotation angle at which the repetitive pitch is varied. The direction of the disk 1 can be detected from the positions at which the pattern pitch is varied respectively. In the case that the diffraction grating pattern is the repetitive pattern 20c or 20d, the center and the direction of the disk 1 can be similarly detected by using the same method as above.

Figure 8:
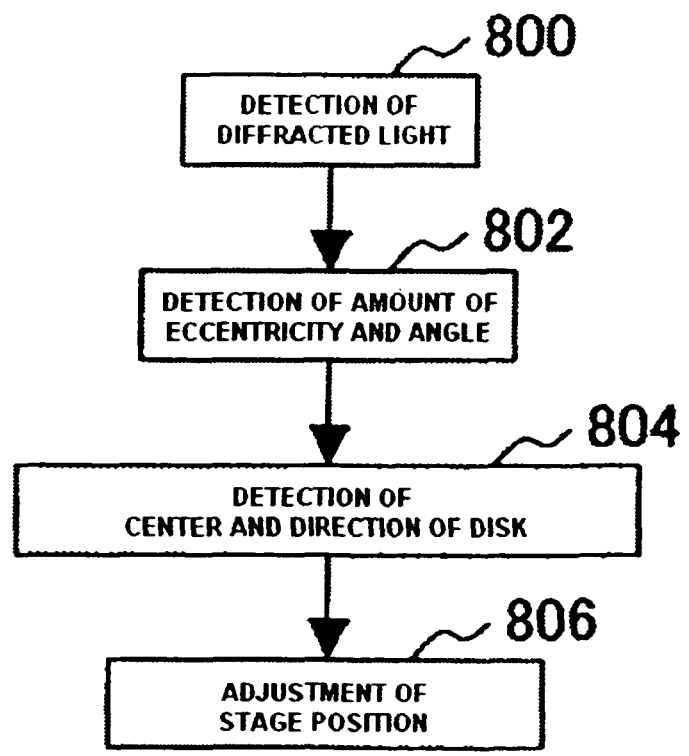
FIG. 8 shows a flowchart showing an alignment sequence.

Next, a method of aligning the disk 1 with the disk holding stage of the optical Inspection apparatus or the like is described according to FIG. 8. First, the disk 1 is held on the disk holding stage 16, then laser light is irradiated to the diffraction grating pattern 20 while rotating the disk 1 so that a position of diffracted light is detected by the CCD camera 15 (step 800). Next, the amount of eccentricity of the disk 1 and the angle at which the position of diffracted light is changed are detected based on the detected data (step 802). Next, a center and a direction of the disk 1 are detected from the detected amount of eccentricity and the detected angle at which the position of diffracted light is changed (step 804). Next, the XY stage and the θ stage of the disk holding stage 16 are driven such that the detected center and direction of the disk correspond to a desired position and a desired direction respectively (step 806). According to the above, alignment of the disk 1 with the disk holding stage 16 is completed.

While an example where the diffraction grating pattern 20 was circumferentially formed was shown in the example 1, the pattern 20 may be formed in at least two regions on the circumference rather than formed on the whole circumference. In this case, data in a form of a sine curve as seen in FIG. 7 are not obtained, but the center and direction of the disk 1 can be detected from the detection position of diffracted light and the rotation angle of the disk holding stage 16.

Figure 9:
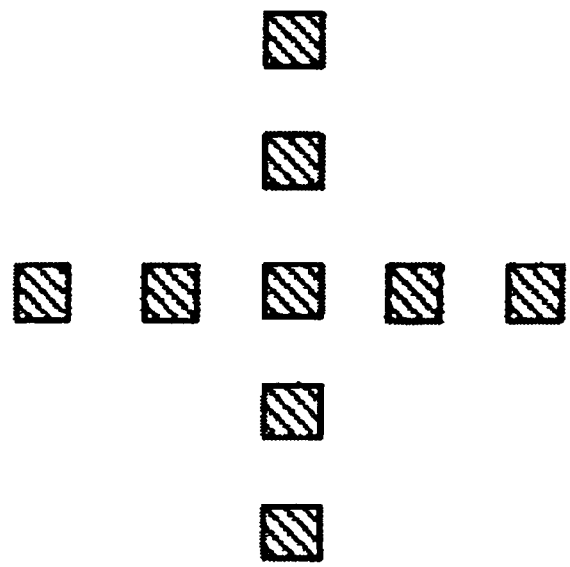
FIG. 9 shows a diagram showing an example of a diffraction grating pattern.

Moreover, the circumferential, repetitive pattern may be combined with the radially repetitive pattern. For example, as shown in FIG. 9, the circumferential, repetitive pattern and the radially repetitive pattern may be combined to be formed into a cross-shaped pattern. Moreover, at least three such diffraction grating patterns are provided, and one of them is made to be a pattern being distinguishable from the other two, thereby detection accuracy can be further improved. See also FIG. 14 and the description thereof below.

Moreover, when diffracted light is detected while the disk 1 is not only rotated, but also moved in a radial direction (XY direction), detection accuracy of the center and direction can be more improved.

In the example 1, while the bit patterned media was described as the patterned media as an example, but discrete track media, on which grooves are formed with a predetermined track pitch, may be used in place of the bit patterned media. That is, the diffraction grating pattern 20 is formed as an alignment pattern in the inner circumference (or outer circumference) of the discrete track media, then the diffraction grating pattern 20 is irradiated with detection light and diffracted light is detected, thereby the center and direction of the disk 1 can be detected.

Figure 10:
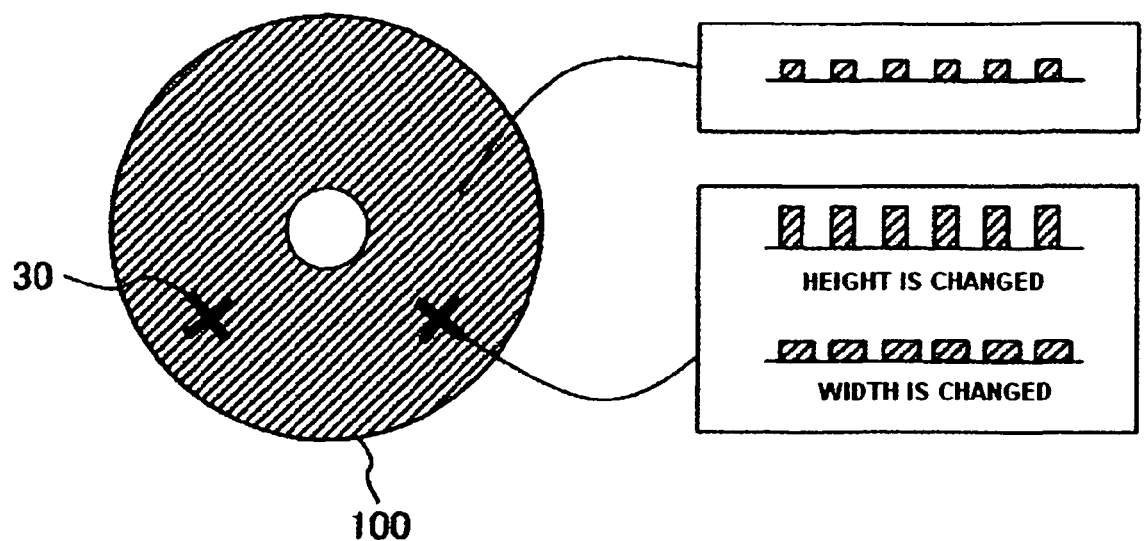
FIG. 10 shows a schematic plan diagram showing a configuration of patterned media according to example 2.
Figure 11:
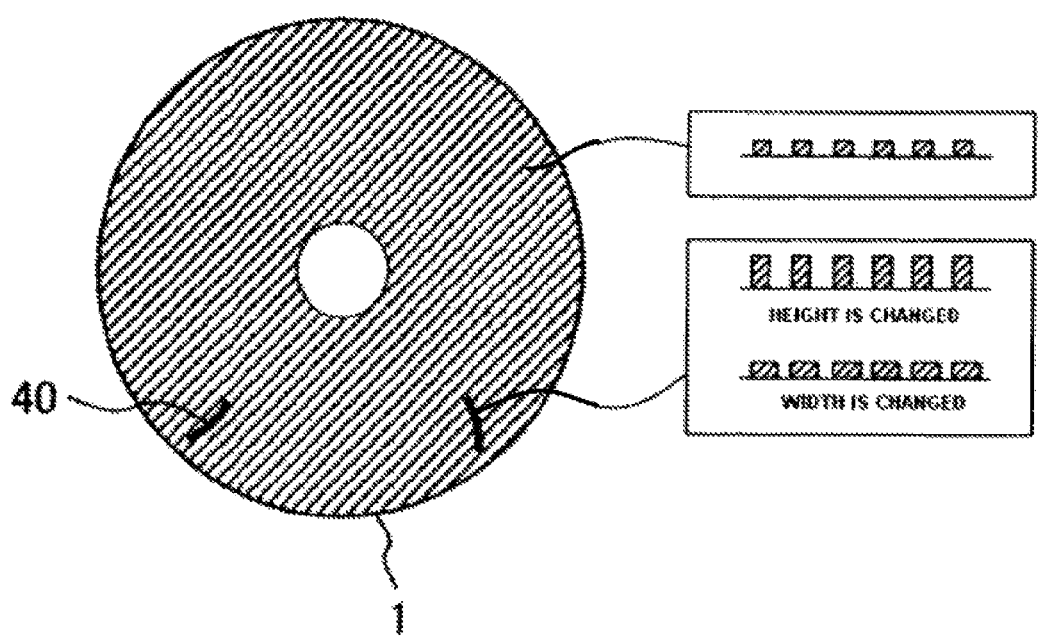
FIG. 11 shows a schematic plan diagram showing another configuration of the patterned media according to example 2.

Next, features of patterned media (hereinafter, referred to as disk) 100 according to example 2 are described with reference to FIGS. 10 and 11. A basic configuration is the same as the configuration as shown in FIG. 2, and the same references are used for the same components. In the example 2, an alignment pattern is formed on a bit pattern 6 of the disk 100. The alignment pattern is detected, thereby a center and a direction of the disk are detected, so that alignment of the disk with the disk holding stage is performed.

In the patterned media, when a partial area of a bit pattern is changed in height or width, reflectivity of the area is changed and thus the area appears in a different color. Thus, a bit pattern configuration in the partial area on a disk surface is changed from that in other areas, thereby the relevant area can be visualized as an alignment mark. FIG. 10 shows a cross-shaped alignment mark 30, showing a case that the bit pattern 6 in the cross-shaped portion is changed in width or height and thus visualized. FIG. 11 shows a case that a servo pattern 40 is subjected to the same operation.

Figure 14:
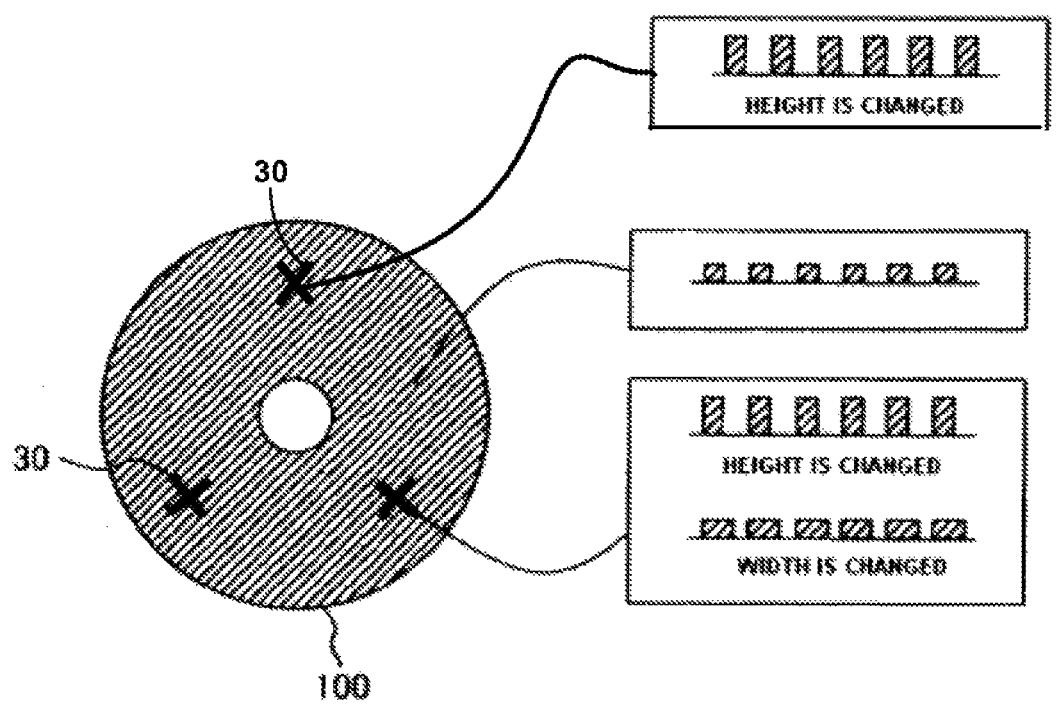
FIG. 14 shows a schematic diagram showing a schematic configuration of an optical system for detecting an alignment mark.

In the example, while at least one alignment mark 30 similarly needs to be provided on the disk surface accuracy can be improved by providing at least two alignment marks. FIG. 14 illustrates an embodiment similar to FIG. 10, but having three alignment marks 30.

Figure 12:
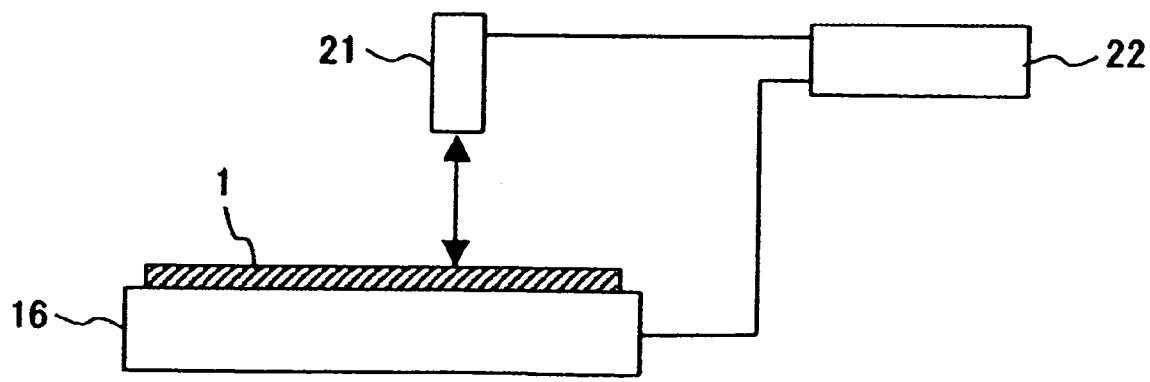
FIG. 12 shows a schematic diagram showing a schematic configuration of an optical system for detecting an alignment mark.

Next, description is made on a method of detecting the center and direction of the disk 100 by using the alignment mark 30. FIG. 12 shows a schematic diagram of an alignment apparatus provided in an optical inspection apparatus or the like. The alignment apparatus includes an alignment mark detection optical-system 21, a disk holding stage 16, and a signal processor 22. An optical system of the alignment mark detection optical-system 21 may be a typical microscopic-optical-system, and as a light source, monochromic laser light or a white light source such as xenon lamp may be used. However, when detection light has a large wavelength, since change in surface reflectivity due to difference in bit pattern configuration is reduced, and light in an ultraviolet range is relatively largely changed in surface reflectivity due to difference in bit pattern configuration, the light in the ultraviolet range needs to be used as the detection light. Moreover, a detector needs to have detection sensitivity in the ultraviolet range. The disk holding stage 16 is the same one as the described stage.

Detection of the center and direction of the disk 100 is achieved by detecting the alignment mark 30. For example, consideration is made on a case of using an alignment mark 30 having a cross shape as shown in FIG. 10. Since the cross-shaped portion has a reflectivity different from that in other portions, the portion can be used as an alignment mark. An area including the mark is detected as an image by the detector, and a position of the mark on the disk can be detected from a mark position in the detected image and a position of the disk holding stage 16. Since a relationship between the alignment mark 30, and the center and direction of the disk 100 is previously determined, the center and direction of the disk 100 can be detected from the detected position of the alignment mark 30.

Figure 13:
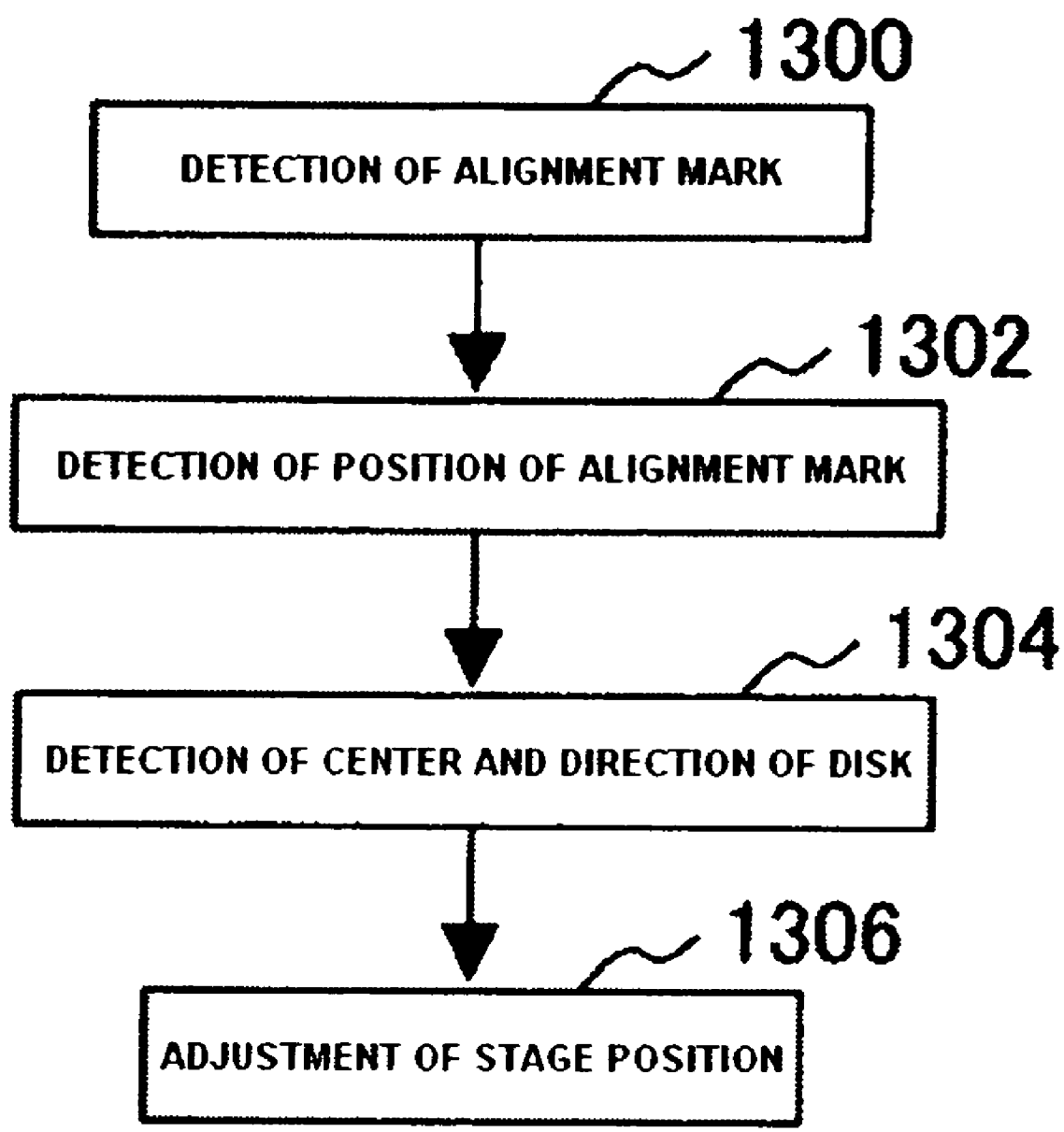
FIG. 13 shows a flowchart showing an alignment sequence of the patterned media according to example 2.

Next, an alignment sequence is described using FIG. 13. First, the disk is held on the disk holding stage, then detection light is irradiated to the disk while rotating the disk so that the alignment mark 30 is detected (step 1300). Next, a position of the detected alignment mark 30 is detected (step 1302). Next, a center and a direction of the disk are detected based on the detected mark position (step 1304). Next, the disk holding stage 16 is driven in X, Y and θ directions such that the detected center and direction of the disk correspond to a desired position and a desired direction respectively (step 1306). According to the above, alignment of the disk 100 with the disk holding stage 16 is completed.

In the example 2, the bit patterned media was similarly described as the patterned media as an example, discrete track media, on which grooves are formed with a predetermined track pitch, may be used in place of the bit patterned media.

While the examples 1 and 2 are in a configuration where the alignment apparatus has a stage, for example, a stage mounted on the optical inspection apparatus, AFM, or SEM may be used as the stage. In this case, the same detection optical system is mounted in respective apparatuses, thereby the alignment can be performed in each apparatuses.

Figure 4:
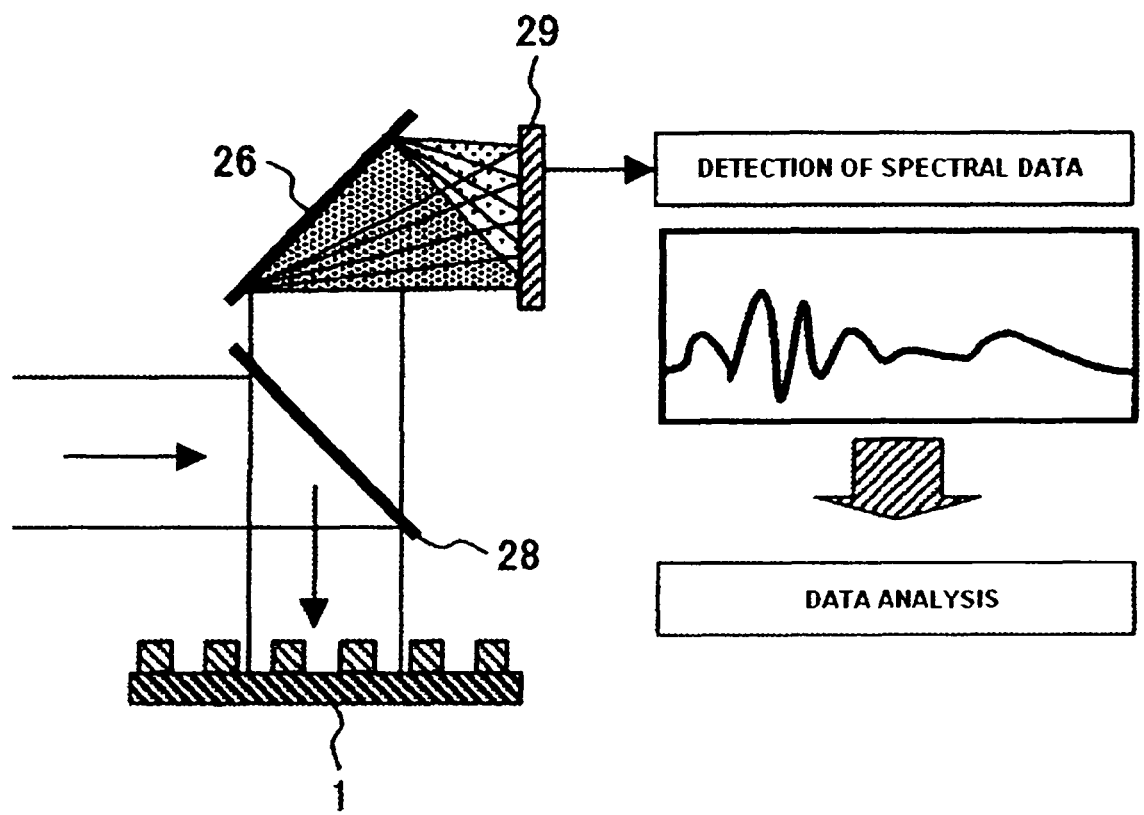
FIG. 4 shows a schematic diagram showing a schematic configuration of an optical inspection apparatus.
Figure 5:
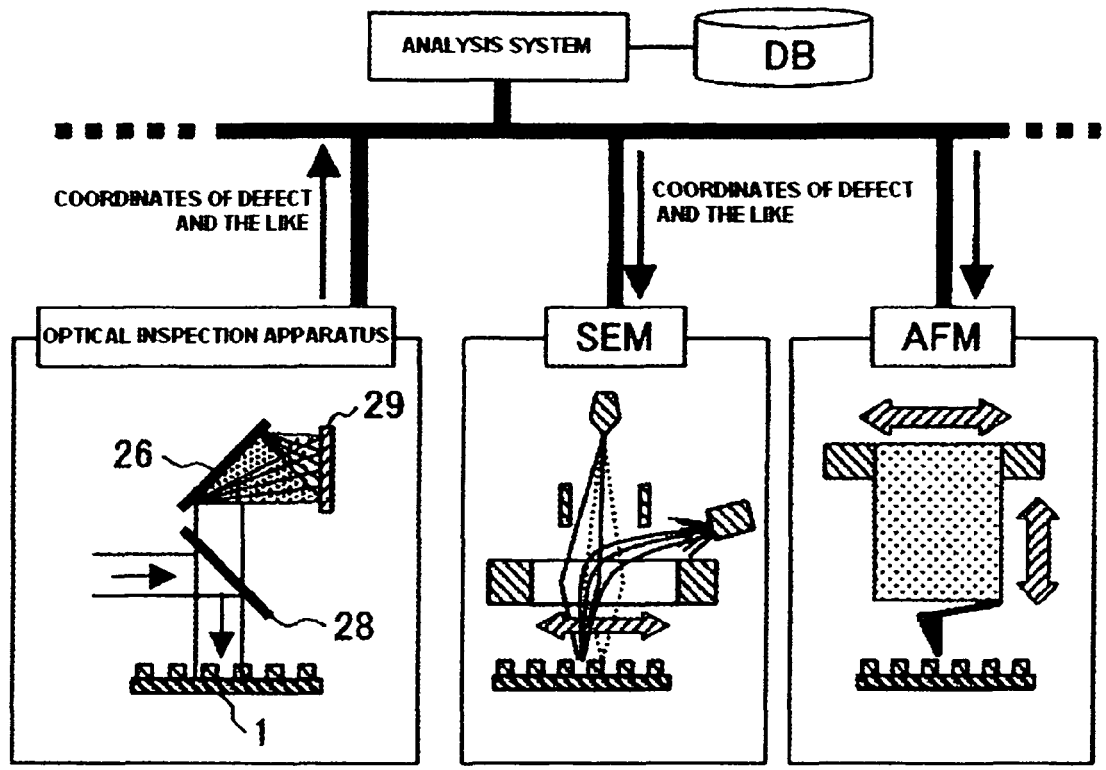
FIG. 5 shows a schematic block diagram of a patterned-media inspection system.

According to the methods described in the examples 1 and 2, the disk is aligned with the disk holding stage of the optical inspection apparatus as shown in FIGS. 4 and 5, then Inspection of the whole disk surface is performed by the optical inspection apparatus. The optical inspection apparatus has a half mirror 28 for introducing light from a light source to the disk surface, a diffraction grating 26 for receiving reflected light from the disk 1, and a detector 29 for detecting spectral diffraction from the diffraction grating 26. In inspection by the optical inspection apparatus, when a fact that a bit pattern is defective can be detected, but a type of a defect can be hardly specified, the optical inspection apparatus specifies a position (coordinates) of the defect from the center and direction (coordinate reference) of the disk detected during alignment, and transmits the position (coordinates) of the defect to SEM or AFM. In SEM or AFM, inspection for specifying a type of the defect can be performed based on the position (coordinates) of the defect received from the optical inspection apparatus.

What is claimed is:

1. Hard disk media having:
   a substrate; and
   bit patterns of magnetic material on the substrate with a predetermined track pitch and a predetermined bit cycle; and
   a diffraction grating pattern on an inner circumferential portion or an outer circumferential portion of the substrate, and said diffraction grating pattern includes a set of patterns having a pitch different from other patterns of the grating pattern, wherein the portion having the different pitch corresponds to an area where the diffraction grating pattern does not exist.

2. The hard disk media according to claim 1, wherein the diffraction grating pattern is an irregular pattern repeated in a circumferential direction.

3. The hard disk media according to claim 1, wherein the diffraction grating pattern is an irregular pattern repeated in a concentric manner.

4. The hard disk media according to claim 1, wherein the patterns are oriented in a radial direction.

5. Hard disk media having:
   a substrate,
   a discrete track having a magnetic material formed on the substrate, in which grooves are formed with a predetermined track pitch in the magnetic material, or bit patterns are formed in the magnetic material on the substrate with a predetermined track pitch and a predetermined bit cycle; and grating patterns of the magnetic material on an inner circumferential surface or an outer circumferential portion of the substrate, and said diffraction grating patterns are formed in at least two regions in the inner circumferential portion or the outer circumferential portion of the substrate, wherein the diffraction grating patterns are oriented in a radial direction.

6. The hard disk media according to claim 5, wherein said diffraction grating patterns are provided in three regions in the inner circumferential portion or outer circumferential portion of the substrate, and the diffraction grating pattern formed in one of the three regions is a diffraction grating pattern being distinguishable from other diffraction grating patterns formed in the outer regions.

7. Hard disk media having:

a substrate, and a discrete track having a magnetic material formed on the substrate, in which grooves are formed with a predetermined track pitch in the magnetic material, or bit patterns are formed in the magnetic material on the substrate with a predetermined track pitch and a predetermined bit cycle, the bit patterns being annularly continuous in a circumferential direction, wherein said discrete track or said bit patterns have convex portions protruding above an uppermost surface of the substrate, the convex portions each having a profile in a partial area of the discrete track or bit pattern that is different from a profile of the convex portions in other areas.

8. The hard disk media according to claim 7, wherein the convex portions in the partial area are different in height or width from convex portions in other areas.

9. A method of positioning hard disk media on a disk holding stage of a surface inspection apparatus, the hard disk media having a substrate, and a discrete track formed on the substrate in which grooves are formed with a predetermined track pitch, or bit patterns formed on the substrate with a predetermined track pitch and a predetermined bit cycle, wherein a diffraction grating pattern is provided on an inner circumferential portion or outer circumferential portion of the substrate, and a portion with a pitch different from a pitch in other portions, is provided in at least one region of the diffraction grating pattern, the method being characterized by including:

holding the hard disk media on the disk holding stage, a step of irradiating light to the diffraction grating pattern while rotating the hard disk media, detecting diffracted light from the diffraction grating pattern, detecting an amount of eccentricity and an angle of the hard disk media from the detected diffracted light, detecting a center and a direction of the hard disk media from the detected amount of eccentricity and the detected angle, and adjusting a position of the disk holding stage such that the detected center and the detected direction correspond to a desired position and a desired direction respectively.

10. A method of positioning hard disk media on a disk holding stage of a surface inspection apparatus, the hard disk media having:

a substrate, and a discrete track, in which grooves are formed with a predetermined track pitch, or a bit pattern, which is regularly dispersed with a predetermined track pitch and a predetermined bit cycle, on the substrate, wherein a profile of convex portions in a partial area of the discrete track or the bit pattern is different from a profile of convex portions in other areas, the method being characterized by including:

holding the hard disk media on the disk holding stage, irradiating light to the discrete track or the bit pattern while rotating the hard disk media, detecting reflected light from the discrete track or the bit pattern, detecting an area where the convex portions having the different configuration exist from the detected reflected light, detecting a center and a direction of the hard disk media from a position of the detected area, and adjusting a position of the disk holding stage such that the detected center and the detected direction correspond to a desired position and a desired direction respectively.

11. The hard disk media according to claim 1, wherein the diffraction grating patterns are not aligned in a circumferential direction with the grooves or bit patterns of the discrete track.

12. The hard disk media according to claim 1, wherein the discrete track or bit patterns are positioned between the inner and outer circumferential portions of the of the substrate.

13. The hard disk media according to claim 5, wherein the discrete track or bit patterns has a continuous, annular shape.

* * * * *